United States Patent Office 3,440,304
Patented Apr. 22, 1969

3,440,304
CURING AND EXTRUDING ELASTOMERIC BLOCK COPOLYMERS
Warren S. Hall, Bartlesville, Okla., and Edward F. Ross, Akron, Ohio, assignors to Phillips Petroleum Company, a corporation of Delaware
No Drawing. Filed Jan. 10, 1966, Ser. No. 519,461
Int. Cl. C08f *15/40, 45/72*
U.S. Cl. 260—880   3 Claims

ABSTRACT OF THE DISCLOSURE

A completely cured and moldable thermoplastic composition is formed by compounding an elastomeric block copolymer consisting of a copolymer block of a conjugated diene and less than 10 weight percent of a monovinyl-substituted aromatic hydrocarbon and a homopolymer block of a monovinyl-substituted aromatic hydrocarbon in the presence of a vulcanizing agent at a temperature in the range of 370 to 550° F. for a period of time sufficient to completely vulcanize said block copolymer and thereafter extruding the resulting vulcanized thermoplastic composition.

---

This invention relates to a method for the processing of block copolymer compounds.

It is known that various types of polymers can be prepared from different monomeric materials, the particular type formed being generally dependent upon the procedure followed in contacting the materials in the polymerization zone. For example, copolymers such as butadiene-styrene copolymer can be prepared by the simultaneous reaction of the copolymerizable monomers. It is also possible to prepare polymers which are commonly known as graft polymers. Graft polymers result from the joining of a comonomer to an already formed polymer at random points along the polymer chain. Still another type of polymer can be obtained by following a procedure known as block polymerization. The polymers, usually referred to as block polymers, are formed by polymerizing a monomer onto the end of a polymer, the monomer being introduced in such a manner that substantially all of the coreacting molecules are joined onto the ends of the polymer chain. The particular method used in preparing the polymers has a great influence upon the properties of the product obtained. Thus, copolymers, graft polymers and block polymers differ greatly in their properties even though the weight percent of each of the monomeric materials contained in the polymer may be the same in each case.

In the conventional handling of elastomeric polymers, the rubbery material is first compounded with the desired ingredients of the particular recipe and the resulting compounded mass is thereafter vulcanized. Once vulcanized or cured, no additional molding or forming of the material can be achieved.

In contrast thereto, I have discovered that with certain block copolymers vulcanization or curing can be achieved during the compounding step and the resulting cured mass which exhibits thermoplastic properties can be satisfactorily extruded or molded.

It is thus an object of this invention to provide a novel process for the curing and forming of block copolymers. Other aspects, objects and the several advantages of this invention will be apparent from the disclosure and the appended claims.

In accordance with this invention, I have discovered that by curing of block copolymers containing a copolymer block of a conjugated diene selected from the group consisting of 1,3-butadiene, isoprene and piperylene and a vinyl-substituted aromatic hydrocarbon and a homopolymer block of said vinyl-substituted aromatic hydrocarbon during compounding there is achieved a completely cured composition which exhibits a thermoplastic state and which can thereafter be molded or extruded. Normally, rubbery compounds are not permitted to vulcanize during mixing and steps are taken to prevent any premature vulcanization or scorching from occurring. Thus the instant invention represents a significant departure from conventional handling of rubbery elastomers as known in the art since it eliminates various intermediate processing steps heretofore required of rubbery compounds and allows the molding or extruding of a cured composition.

In carrying out the process of this invention, the ingredients to be compounded into the block copolymer are added and the mass is thereafter masticated in a zone which is heated to a temperature substantially above that normally employed for the compounding of rubber. A temperature generally in the range of 400 to 600° F. is employed. Since this is well above the temperature normally employed with rubbery elastomers, the process provides a low cost thermoplastic method of achieving a low cost thermoplastic material for processing in plastic extrusion or molding equipment. After compounding the block copolymer at the elevated temperature, the resulting material exhibits a thermoplastic state and can thus be extruded or molded. The material is retained in the compounding or mixing zone while vulcanization occurs.

The above process represents a departure from conventional rubber handling since rubber is not normally vulcanized during the mixing stage since the vulcanizing ingredients are normally added either in a second mix which is conducted at a sufficiently low temperature to prevent vulcanization or, if added to the initial mix, the temperature of the mass is maintained at a low level generally in the range of 150 to 350° F. In addition, while it is known that rubber will increase in temperature during mixing, as pointed out above, care is taken to prevent any curing at this point in the conventional handling of same since premature curing or scorch results in an impairment of the properties of the rubber.

The conventional operation of the compounding or mixing zone is to cool the rotors therein so as to prevent heat increase therein sufficient to cause vulcanization to occur.

In contrast thereto, in accordance to the present invention heat is added thereto so as to assure the occurrence of vulcanization or curing in the mixing zone. The temperature required is generally above 370° F., preferably above 400° F. and below 550° F., since rubber will disintegrate above 550° F. The desired heat can be provided by any known means for heating a zone such as addition of heat through the rotors of the mixing zone or by using a mixing zone having a jacketed wall through which heat can be provided.

Block copolymers which are useful in this invention are those formed by contacting selected conjugated dienes and vinyl-substituted aromatic hydrocarbons with an organolithium catalyst in the presence of a hydrocarbon diluent selected from the groups consisting of aromatic hydrocarbons, paraffins and cycloparaffins. It is seen that in the practice of the instant process, the polymerizable monomers are changed simultaneously to the polymerization zone. This procedure is to be contrasted with conventional processes for forming block polymers wherein a monomer charge is introduced into the polymerization zone only after the preceding charge has been polymerized or any unpolymerized portion removed.

The polymers prepared by this process are to be distinguished from copolymers in that the final product is made up of blocks or segments. One of the blocks forming the polymer chain is a copolymer of a conjugated diene and a vinyl-substituted aromatic hydrocarbon while another block is a homopolymer of a vinyl-substituted aromatic hydrocarbon. The copolymer block generally contains only a small amount of styrene, for example, less than 10 weight percent. When utilizing as the charge to the polymerization zone a mixture of 75 parts by weight butadiene and 25 parts by weight styrene, it has been found that the copolymer block contains from about 5 to 7 percent styrene.

The organolithium compound used as the catalyst in the process of this invention corresponds to the formula RLi, wherein R is a radical selected from the group consisting of alkyl, aryl, cycloalkyl, aralkyl, alkaryl, alkylcycloalkyl and cycloalkylalkyl. The R in the formula preferably contains from 1 to 10, inclusive, carbon atoms. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4 - butylcyclohexyllithium, 4 - cyclohexylbutyllithium and the like.

Conjugated dienes which are used in preparing the block polymers are 1,3-butadiene, 2-methyl-1,3-butadiene (isoprene), and 1,3-pentadiene (piperylene). The vinyl-substituted aromatic hydrocarbons which can be employed can be any vinyl-substituted aromatic hydrocarbon. It is to be understood that a compound having a substituent on the alpha carbon atom, such as alpha-methylstyrene, is not applicable to the practice of the instant invention. Examples of vinyl-substituted aromatic hydrocarbons which can be advantageously utilized include styrene, divinylbenzene, 3 - vinyltoluene, 1 - vinylnaphthalene, 2 - vinylnaphthalene, 3-methylstyrene, and the like.

As mentioned hereinbefore, the process for forming the polymers is carried out in the presence of a hydrocarbon diluent selected from the group consisting of aromatic hydrocarbons, paraffins and cycloparaffins. The preferred hydrocarbons of these types are those containing from 3 to 12, inclusive, carbon atoms. Examples of diluents which can be used include propane, isobutane, n-pentane, isooctane, n-dodecane, cyclopentane, cyclohexane, methylcyclohexane, benzene, toluene, xylene, naphthalene, and the like. It is to be understood that mixtures of two or more of these hydrocarbons can be used in the process.

The polymerization process can be carried out at a temperature within the range of −20 to 150° C. However, it is preferred to carry out the process at a temperature in the range of −10 to 80° C. The polymerization reaction can be carried out under autogenous pressures. It is usually desirable to operate at pressures sufficient to maintain the monomeric materials substantially in the liquid phase. The pressure will thus depend upon the particular materials being polymerized, the diluent being employed, and the temperature at which the polymerization is carried out. However, higher pressures can be employed if desired, these pressures being obtained by some such suitable method as the pressurization of the reactor with a gas which is inert with respect to the polymerization reaction.

The amount of the catalyst which is used in the preparation of block polymers can vary over a wide range. In general, at least 0.05 part by weight of the organolithium compound per 100 parts by weight of the total monomers to be polymerized is employed in the process. The upper limit for the amount of the organolithium compound to be used depends primarily upon the desired inherent viscosity of the polymer resulting from the polymerization. The inherent viscosity of the polymer produced decreases with increasing amounts of the organolithium compound. A preferred catalyst level is from 0.1 to 2 parts by weight of organolithium per 100 parts by weight of total monomers charged to the polymerization zone.

The process is preferably carried out as a batch process by charging the conjugated diene and the vinyl-substituted aromatic hydrocarbon into a reactor containing the organolithium catalyst and the diluent. The monomeric materials are introduced into the reactor simultaneously in any desired proportion depending upon the product which it is desired to obtain. The process can also be carried out semicontinuously by introducing additional charges of the monomeric materials into the reactor after the initial charges have been polymerized. When a batch process is utilized, the time for the reaction can be as high as 24 hours or more although it is generally less than 24 hours.

Various materials are known to be destructive to the organolithium catalyst. These materials include carbon dioxide, oxygen and water. It is highly desirable, therefore, that the monomers be free of these materials as well as other materials which tend to inactivate the catalyst. Any other known means for removing such contaminants can be used. Also, it is preferred that the diluent used in the process be substantially free of impurities such as water, oxygen and the like. In this connection, it is desirable to remove air and moisture from the reaction vessel in which the polymerization is carried out. Although it is preferred to carry out the polymerization under anhydrous or a substantially anhydrous condition, it is to be understood that some water can be tolerated in the reaction mixture. However, the amount of water which can be tolerated in the mixture is insufficient to completely inactivate the catalyst.

After the polymerization has been carried out to the desired degree, the catalyst remaining can be deactivated by the addition of a material such as ethyl alcohol, isopropyl alcohol, or the like. It is generally preferred to add only an amount of the catalyst deactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. Deactivation of the catalyst and precipitation of the polymer can be accomplished in a single step. The precipitated polymer can then be recovered by filtration, decantation, and the like. In order to further purify the polymer, the separated polymer can be redissolved in a suitable solvent and again precipitated by addition of an alcohol. Thereafter, the polymer is again recovered by suitable separation means, as indicated hereinbefore, and dried. Any suitable hydrocarbon solvent, such as mentioned hereinbefore, can be used in this purification step to redissolve the polymer. The diluent and alcohol can in all cases be separated, for example, by fractional distillation, and reused in the process. Antioxidant can be used in the process to prevent oxidation of the polymer. The antioxidant can be added to the reaction mixture prior to precipitation of the polymer, to the solution of redissolved polymer, or to the diluent in which the polymer is to be subsequently redissolved.

A more comprehensive understanding of the invention can be made by referring to the following illustrative example which is not intended, however, to be unduly limitative of the invention.

EXAMPLE

Butadiene-styrene block polymers are made in which substantially all of the butadiene is polymerized first and then the styrene polymerizes onto the end of the butadiene polymers. 700 parts of cyclohexane and 75 parts butadiene are heated to a temperature high enough that the temperature of a blend will be 120° F. when 25 parts of styrene, 0.13–0.15 part of normal butyllithium, in 20 percent normal hexane, are stirred together. The temperature rises for 15–20 minutes until it reaches about 230° F.

At this temperature all of the butadiene and styrene are reacted and the pressure is 40 p.s.i.g. The products are flashed to 15–18 p.s.i.g. and about 30 percent normal hexane is removed. The remainder of the product stream is steam stripped, and the crumb is passed over a shaker screen. The crumb, which contains about 50 percent water, is passed through an expeller to remove water. The effluent rubber from the expeller contains about 15–20 percent water and is added to an expander dryer. The effluent from the expander dryer, which is substantially water-free, is cooled while being conveyed to a baler. The rubber is baled as a product to be used in making various rubber products.

The following constituents are added to a Banbury:

|  | Parts |
|---|---|
| Butadiene-styrene copolymer | 100 |
| Hard clay | 300 |
| Light process oil | 20 |
| Resin (Neville Resin R–16, a coumarone-indene resin) | 15 |
| Zinc oxide | 4 |
| Stearic acid | 2 |
| Petrolatum | 6 |
| Santocure NS - N - cyclohexyl-2-benzothiazyl-sulfonamide | 1.5 |
| Diethylene glycol | 2 |
| Thionex-tetramethylthiuram monosulfide | .3 |
| Sulfur | 6 |
|  | 456.8 |

This mixture is Banburied to about 400° F. in 6 minutes. The resulting cured mass in a plastic state is then dropped into an extruder in which the rubber is extruded into pellets. These pellets are thereafter molded into shoe heels.

The above example clearly discloses that cure of the copolymer is achieved during blending and the cured copolymer can be satisfactorily extruded.

As will be evident to those skilled in the art, various modifications of this invention can be made, or followed, in the light of the foregoing disclosure and discussion without departing from the spirit or the scope thereof.

We claim:

1. A process for forming an extruded completely cured and moldable thermoplastic composition of an elastomeric block copolymer, said block copolymer containing a copolymer block of a conjugated diene selected from the group consisting of 1,3-butadiene, isoprene and piperylene and less than 10 weight percent of a monovinyl-substituted aromatic hydrocarbon and of a homopolymer block of said monovinyl-substituted aromatic hydrocarbon, which comprises compounding said elastomeric block copolymer in the presence of a vulcanizing agent at a temperature in the range of 370 to 550° F. for a period of time sufficient to completely vulcanize said block copolymer and thereafter extruding the resulting vulcanized thermoplastic compositiion.

2. A process according to claim 1 wherein the resulting completely vulcanized thermoplastic block copolymer is molded.

3. A process according to claim 1 wherein said conjugated diene is butadiene and said monovinyl-substituted aromatic compound is styrene.

References Cited

UNITED STATES PATENTS

| 3,023,460 | 3/1962 | Hartman | 260—811 |
| 3,251,905 | 5/1966 | Zelinski | 260—880 |
| 3,265,765 | 8/1966 | Holden et al. | 260—880 |

OTHER REFERENCES

Railsback et al.: Rubber Age, January 1964, pp. 583 to 589.

GEORGE F. LESMES, *Primary Examiner.*

U.S. Cl. X.R.

260—085.1, 829, 879; 264—236